Dec. 21, 1937. W. J. SCHAFER 2,102,857
WOODWORKING MACHINE
Filed Jan. 19, 1937 2 Sheets-Sheet 2
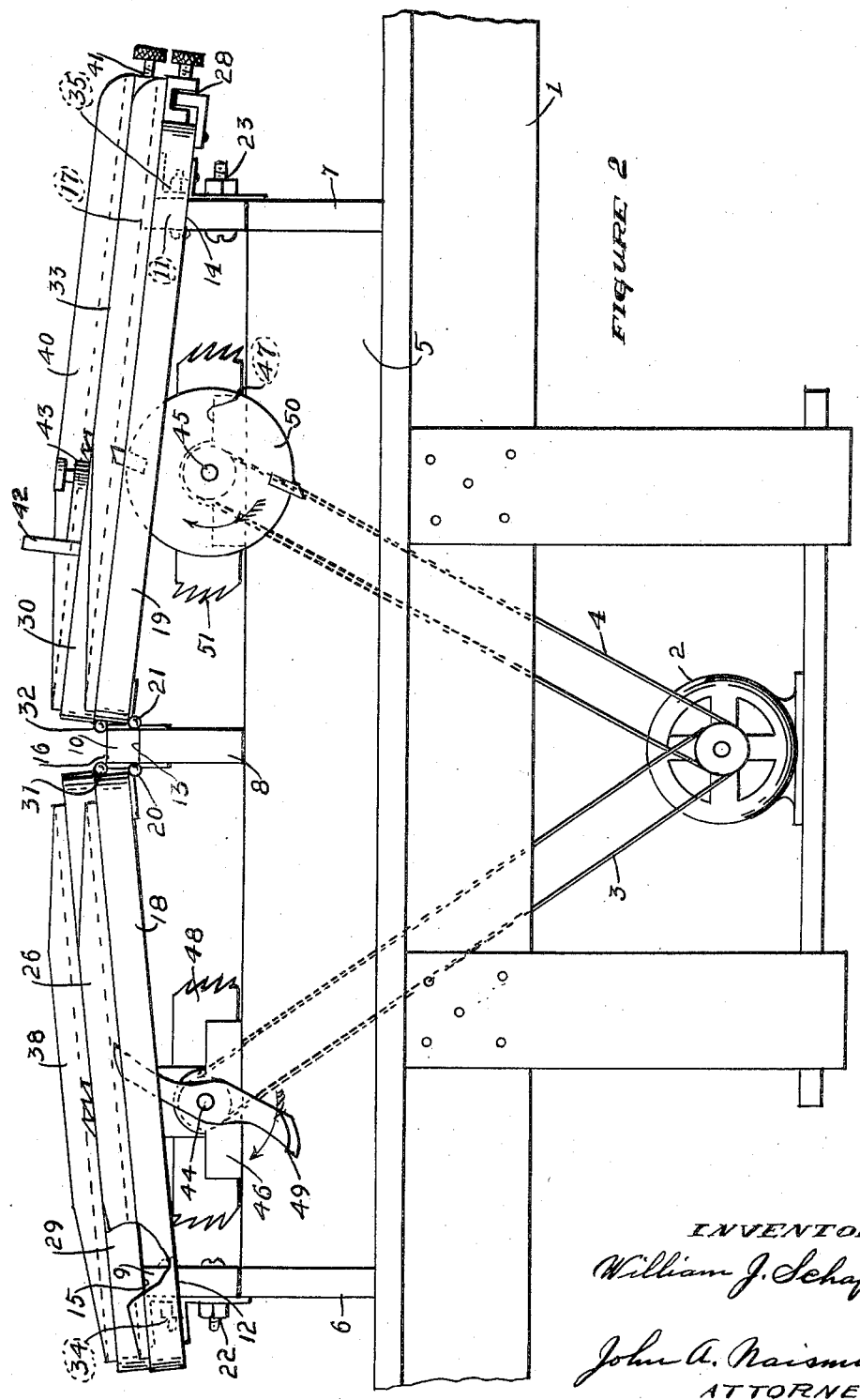
INVENTOR
William J. Schafer
John A. Naismith
ATTORNEY Patented Dec. 21, 1937

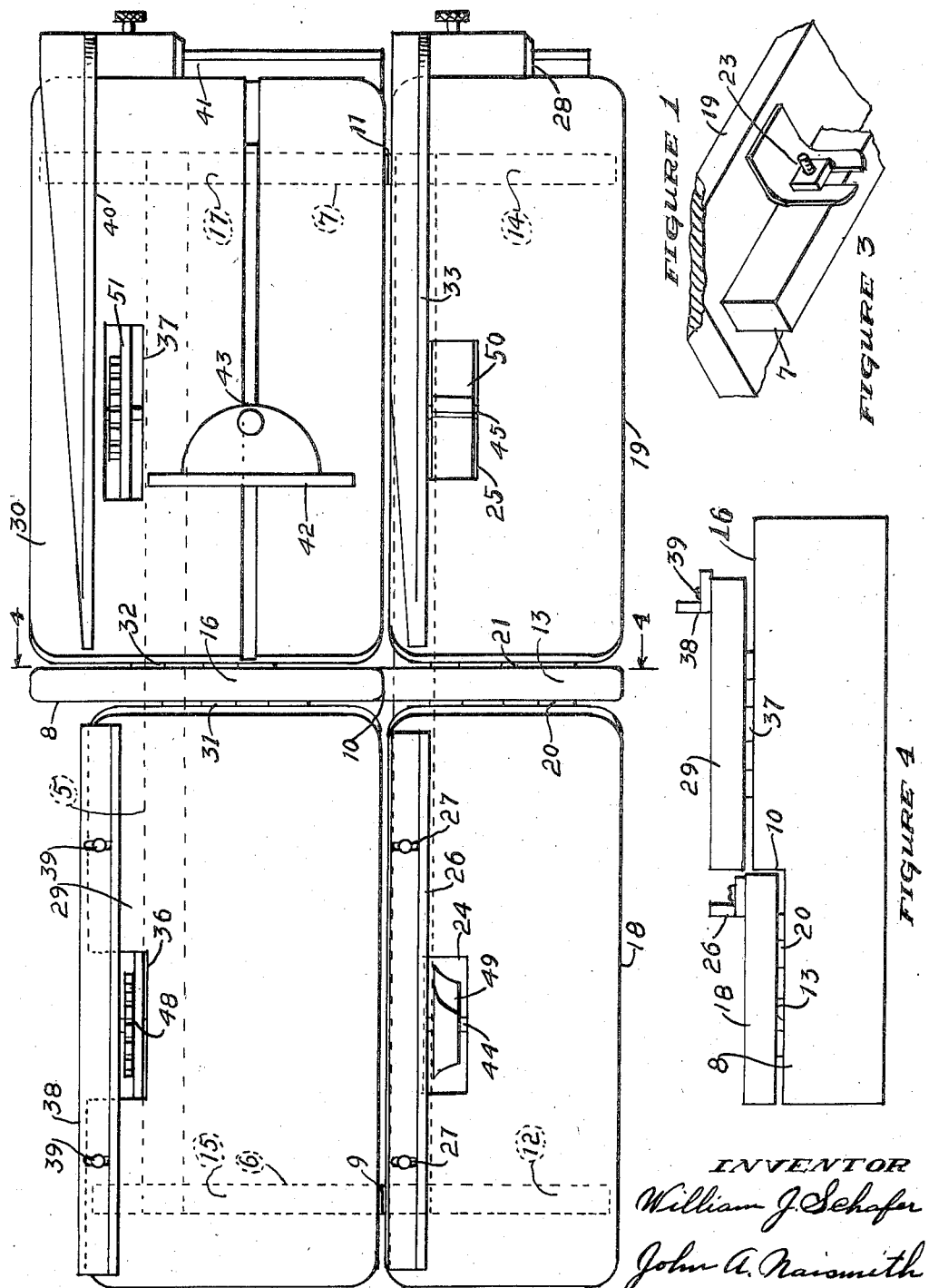

2,102,857

UNITED STATES PATENT OFFICE 2,102,857

WOODWORKING MACHINE

William J. Schafer, San Jose, Calif.

Application January 19, 1937, Serial No. 121,246

1 Claim. (Cl. 144—1)

The present invention relates to a machine particularly adapted for use in cabinet work, and more particularly for use in the manufacture of drawer parts. The cutting and shaping of the several drawer parts as herebefore practiced involves several distinct operations performed by widely separated machines, one consequence of which is that the work can be economically performed with new lumber only. This condition obtains because it is more economical to run a long piece of material through a sticker and then carry it to another machine for cutting into short lengths of desired dimensions than to handle a large number of short pieces of varying lengths.

It is one object of the present invention to provide a machine for the character of work indicated that is so constructed and arranged that one operator will be able to perform all of the required operations thereon and that will, therefore, permit the economic use of stock of any length.

It is also an object of the invention to provide a machine of the character indicated that will be economical to manufacture, simple in form and construction, durable and compact, and highly efficient in its practical application.

In the drawings:

Figure 1 is a plan view of a machine embodying my invention.

Figure 2 is a side elevation of the same with a part broken away.

Figure 3 is a perspective illustration of a portion of one of the inclined tables with its fastening means.

Figure 4 is a view on line 4—4 of Figure 1.

In the particular embodiment of the invention herein disclosed I show at 1 a portion of a supporting bench carrying the operating motor 2 and two driven belts 3 and 4.

At 5 is shown a base frame seated on the bench and having end members 6 and 7 mounted edgewise thereon and disposed crosswise thereof. A similarly arranged member 8 is mounted on the center of the base frame. These cross members are provided for the support of four tables arranged in oppositely inclined pairs and with the pairs at different elevations, consequently they are stepped as at 9, 10 and 11 to provide levels 12, 13, 14 for one pair of tables and higher levels 15, 16, 17 for the other pair of tables. The levels 12 and 14 are uniform in height with the intervening level 13 elevated with respect thereto, and the levels 15 and 17 are likewise of uniform height with the intervening level 16 elevated with respect thereto.

At 18 and 19 are shown one pair of tables hingedly mounted upon opposite sides of member 8 as at 20 and 21 and supported above the level 13 to permit their swinging upwardly on said hinges. These tables are fitted with fastenings indicated generally at 22, 23 whereby they may be secured in place, and they are also provided with openings as 24, 25 through which cutter blades may operate. A gauge member 26 is adjustably mounted on table 18 as at 27, and a guage member 33 is also adjustably mounted on table 19 as at 28.

At 29 and 30 are shown a second pair of tables hingedly mounted upon opposite sides of the member 8 as at 31 and 32 and supported above the level 16 to permit their swinging upwardly on said hinges. The outer ends of these tables are supported on levels 15 and 17 of members 6 and 7, the planes of their top surfaces paralleling those of tables 18 and 19 but elevated with respect thereto whereby material may be fed over the upper edges of gauges 26 and 33. These tables are fitted with fastenings indicated generally at 34, 35 whereby they may be adjusted similarly to tables 18, 19 to secure the desired depth of cut, and they are also provided with openings as 36, 37 through which cutters may operate. A guage member 38 is adjustably mounted on table 29 as at 39, and a gauge member 40 is adjustably mounted on table 30 as at 41. A second gauge member 42 is adjustably mounted on table 30 as at 43 and at right angles to member 40.

At 44 and 45 are shown two shafts mounted in bearings at 46 and 47 on base frame 5. The shaft 44 carries a cutter 48 operating through opening 36 in table 29, and a second cutter 49 operating through opening 24. The shaft 45 also carries two cutters as 50 and 51 operating through openings 25 and 37 in tables 19 and 30 respectively. The shafts 44—45 are driven in the same direction by the motor 2 through the medium of belts 3 and 4.

In the present disclosure it may be assumed that the cutter 48 is for cutting the grooves in the side pieces of a drawer, 49 for rounding the edges of the front piece, and 50 for grooving the front to receive the side pieces, 51 being provided for cutting a wider groove than 48 when the material used requires such wider groove.

It will be apparent from the disclosure that all of the required operations may be performed quickly and easily on this machine, the elevation of the tables 29 and 30 permitting work to be moved thereover as freely as on the lower tables 18 and 19.

Since tables 29 and 30, and tables 18 and 19 are oppositely inclined from the center member 8 it may be readily understood that work moved along one table will pass freely over the opposite table which is so placed as to offer no obstruction. Any cutter head may be changed at will by swinging the cooperating table upwardly about its hinged mounting.

It is to be understood, of course, that while I have herein shown and described but one specific embodiment of the invention, changes in form, construction, and method of assembly and operation may be made within the scope of the appended claim.

I claim:

In a wood-working machine, a supporting frame including a stepped member disposed crosswise thereof on the central portion thereof, and a pair of symmetrically arranged tables associated with each step of said member and inclined outwardly and downwardly from opposite sides thereof with their outer ends supported by said frame, whereby material on any one table projecting over another table will not encounter any item on said other table.

WILLIAM J. SCHAFER.